S. E. HORTON.
CHUCK.
APPLICATION FILED JUNE 14, 1910.
995,006.
Patented June 13, 1911.
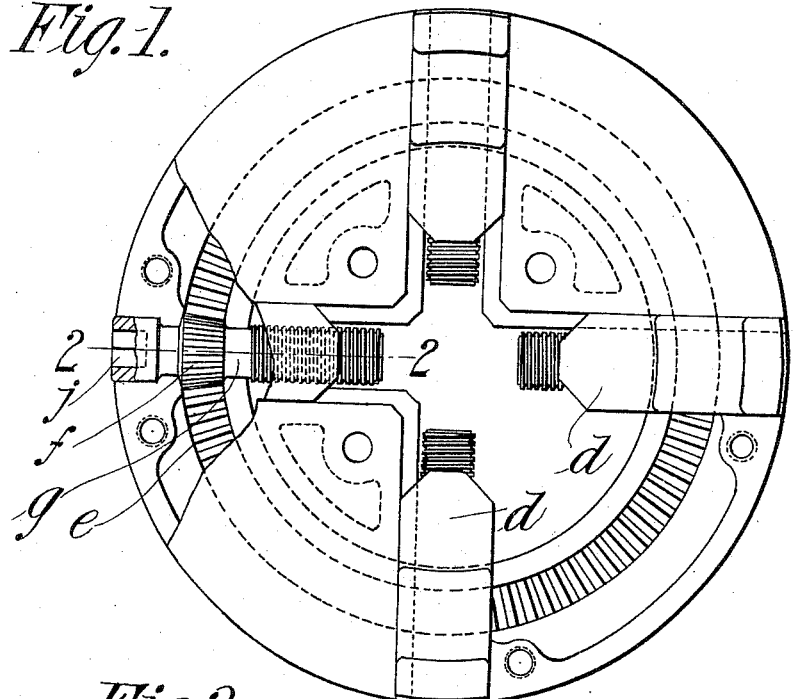
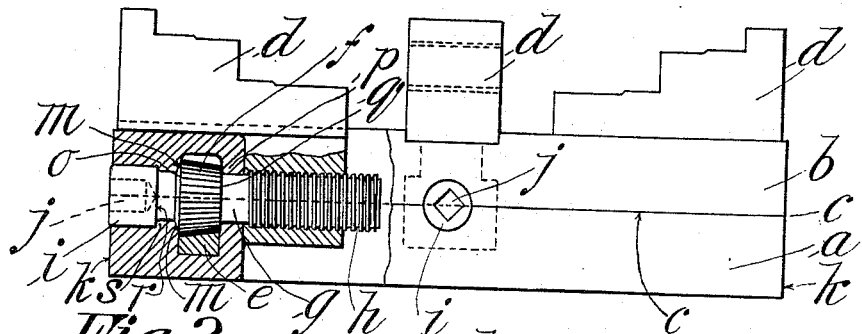
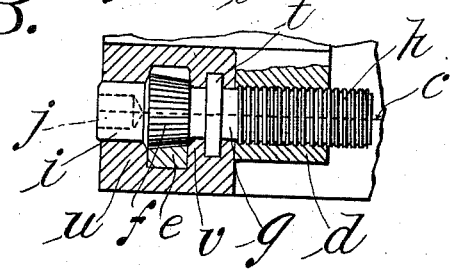
WITNESSES:
INVENTOR,
Sidney E. Horton,
BY
Chapin & Co.
ATTORNEYS.

UNITED STATES PATENT OFFICE.

SIDNEY E. HORTON, OF WINDSOR LOCKS, CONNECTICUT.

CHUCK.

995,006.  Specification of Letters Patent.  Patented June 13, 1911.

Application filed June 14, 1910. Serial No. 566,804.

*To all whom it may concern:*

Be it known that I, SIDNEY E. HORTON, a citizen of the United States of America, residing at Windsor Locks, in the county of Hartford and State of Connecticut, have invented new and useful Improvements in Chucks, of which the following is a specification.

This invention relates to improvements in chucks in which a plurality of radially movable jaws is employed, the number being immaterial, as three or more may be used. It is of the type in which a circular rack or ring is employed to simultaneously operate all the jaws, the rack or ring being mounted in an annular groove or recess in the body portion of the chuck and operated from any one of the adjusting screws.

A particular feature of my invention lies in the mounting for the screw in the chuck body in which the screw is made, substantially flush with the periphery of the chuck and provided with a socket therein, the beveled pinion being designed to take both the inward and outer thrust. As a modification a collar may be employed for this purpose.

In the drawings forming part of this application,—Figure 1 is a plan view of a universal chuck, with a portion of the face plate broken away to show the rack and pinion, also the socket in the end of the screw to receive the wrench. Fig. 2 is a sectional view on the line 2—2 of Fig. 1 showing the screw and rack in side elevation and clearly illustrating the mounting for the screw. Fig. 3 is a view on the same sectional line as Fig. 2 but showing the screw mounted in a slightly different manner.

Referring to the drawings in detail, $a$ designates the back plate and $b$ the face plate of the chuck which engage each other on the line $c$ in the usual manner. Mounted for reciprocation in the plate $b$ are the gripping jaws $d$ four of which are shown, although I do not limit myself to any particular number.

Located in a channel or circular groove in the back plate $a$ is a loosely mounted annular rack $e$ which is engaged by the bevel pinion $f$ formed as an integral part of the screw-shaft $g$. The threads which engage and operate the gripping jaws $d$ are shown at $h$. The screw shaft $g$ is provided in its outer end with a head portion $i$, in the outer end of which is formed a socket $j$ for receiving a solid wrench. This head portion has a bearing in the plates $a$ and $b$. It is to be understood that when any one of the screws $g$ is operated, the pinion $f$, carried thereby, will rotate the rack $e$ which, in turn, will simultaneously operate the jaws through the screw $h$ in the usual manner. The head portion $i$ is substantially flush with the outer surface $k$ of the back and face plates. The part $m$ of the plates $a$ and $b$ serves as a bearing for the portion $o$ of the pinion $f$, and the part $p$ of the plates receives the portion $q$ of the pinion. The forward portion $r$ of the head $i$ has a bearing against the shoulder $s$ of the plates which assists in taking up the inward end thrust of the screw. This mounting for the screw $g$ effectually serves to take up all of the thrust during the operation of adjusting the jaws $d$; that is to say both the inward and outward thrusts on the screw $g$ are provided for when the same is operated by means of a wrench engaging the socket $j$.

In Fig. 3, the screw $g$ is provided with an integral thrust collar $t$ which engages a correspondingly shaped annular recess in the face and back plates $a$ and $b$. The gear $f$ is located adjacent the head portion $i$ so as to make room for the collar $t$. This construction also affords bearing surfaces $u$ and $v$ for the gear $f$.

From this construction, it will be seen that I have produced a very strong and durable mounting for the screw $g$ and one that is well adapted to take up any endwise thrust which may be imparted to the screw by the jaws $d$, either during their advancement or withdrawal movements.

What I claim, is:—

In a universal lathe chuck having back and face plates, adjusting screws having an enlarged head portion for the jaws thereof, and flush with the outer face of the plates, the head portion having a bearing shoulder
5 against the plates to take up inward thrust, and a bevel pinion on the screw, having shoulders on the front and rear side thereof to bear against the plates to take up outward and inward thrust, substantially as described.

SIDNEY E. HORTON.

Witnesses:
WM. H. CHAPIN,
HARRY W. BOWEN.

Copies of this patent may be obtained for five cents each, by addressing the "Commissioner of Patents, Washington, D. C."